Dec. 30, 1969  L. J. NOWAK, JR., ETAL  3,486,240
ROASTING METHOD AND APPARATUS
Filed Oct. 22, 1965  9 Sheets-Sheet 2

INVENTORS.
LEON J. NOWAK, JR.
JOSEPH L. ROBINSON
OTTO C. KROLOPP
JOSEPH H. KEENAN
JOSEPH L. SMITH
BY Parker & Carter
Attorneys.

Dec. 30, 1969   L. J. NOWAK, JR., ETAL   3,486,240
ROASTING METHOD AND APPARATUS
Filed Oct. 22, 1965   9 Sheets-Sheet 3
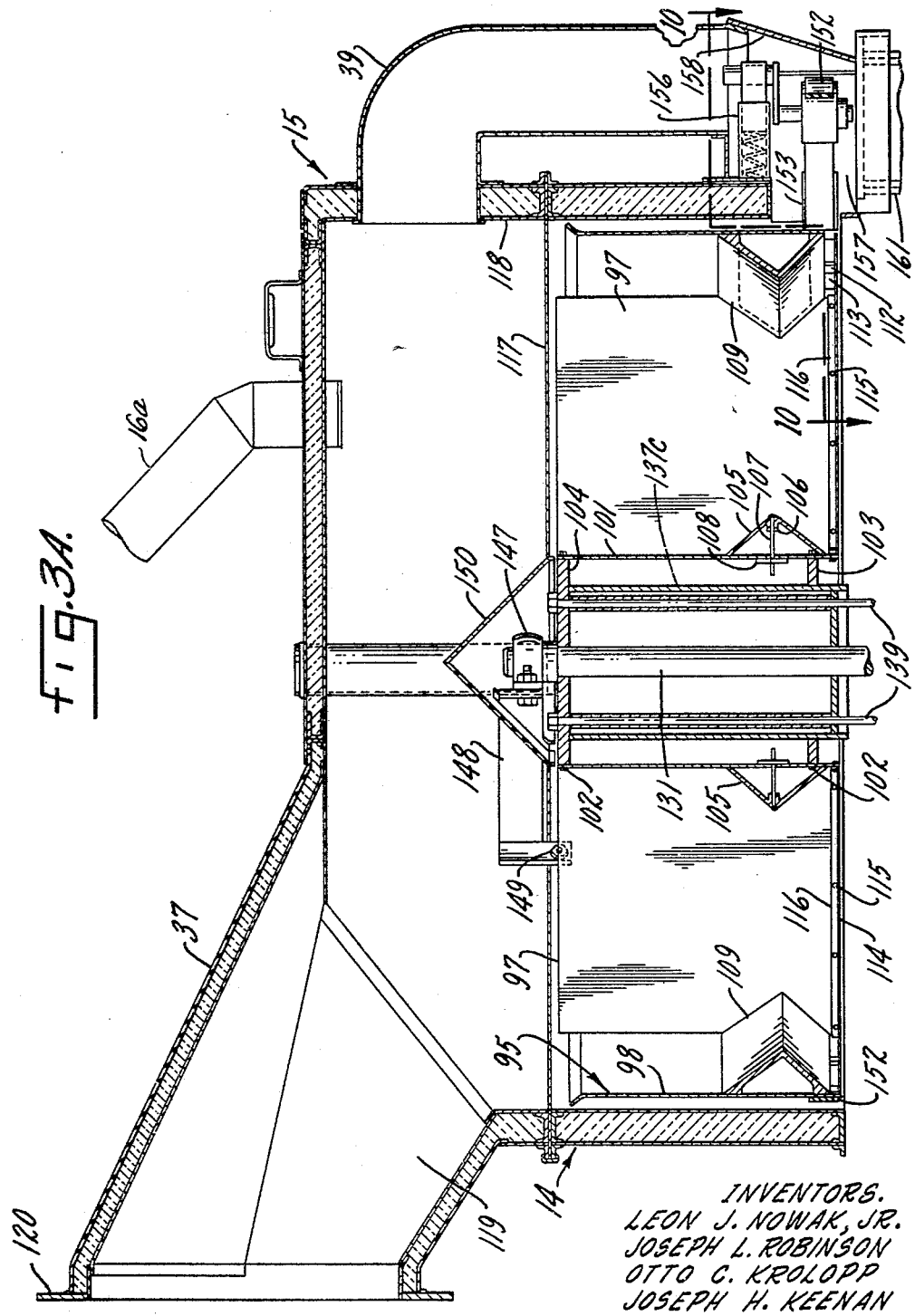
INVENTORS.
LEON J. NOWAK, JR.
JOSEPH L. ROBINSON
OTTO C. KROLOPP
JOSEPH H. KEENAN
JOSEPH L. SMITH
BY Parker & Carter
Attorneys.

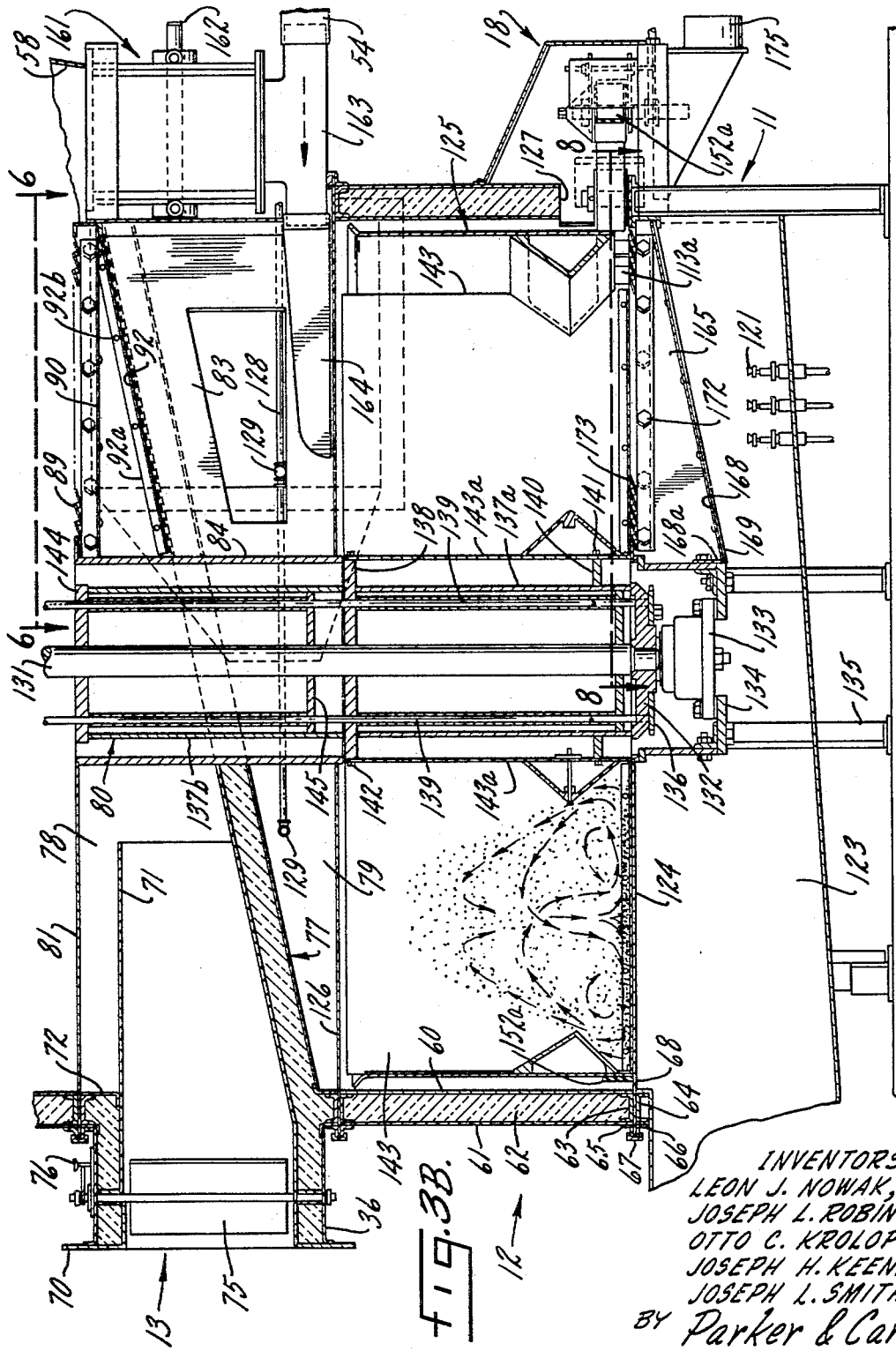

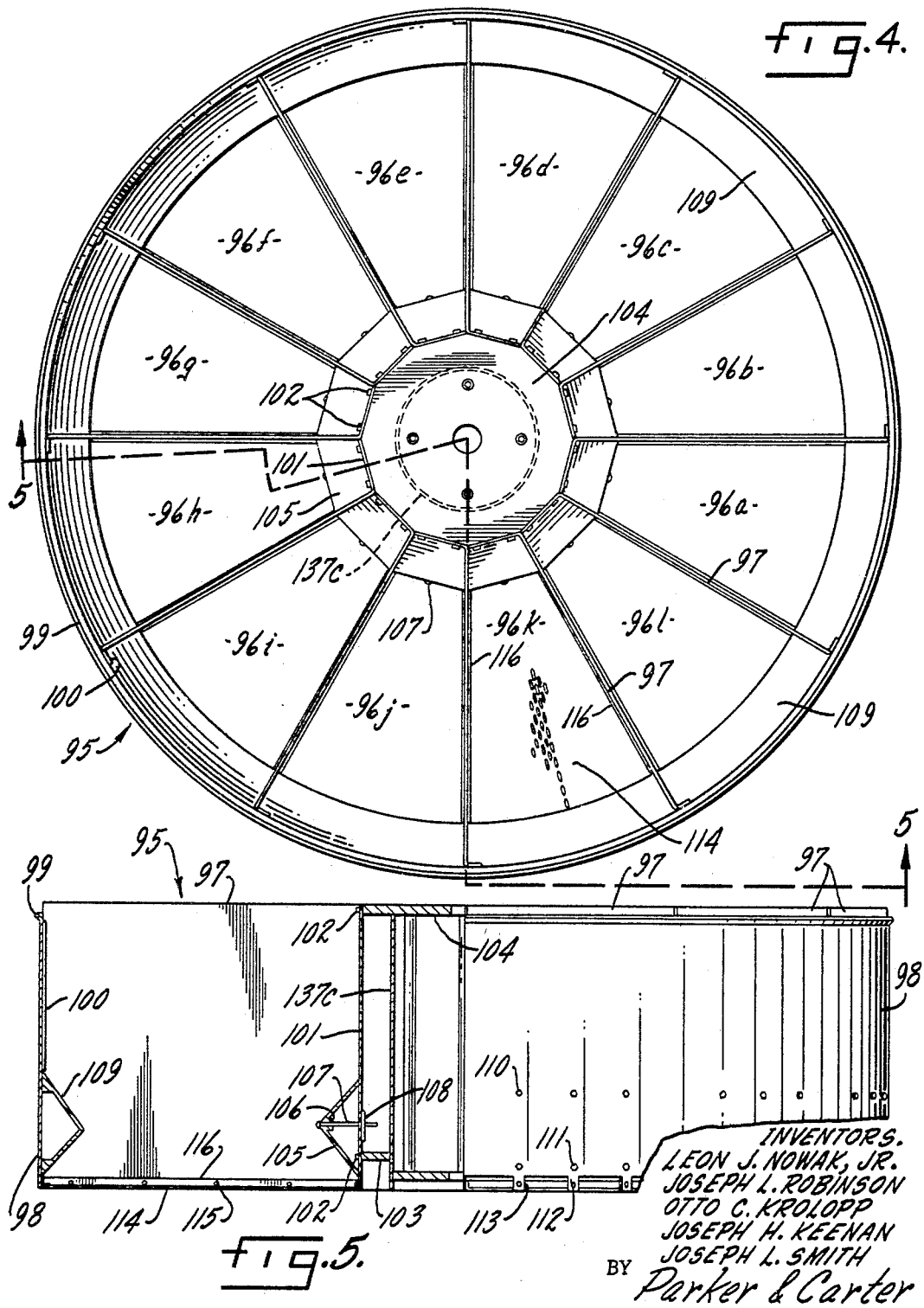

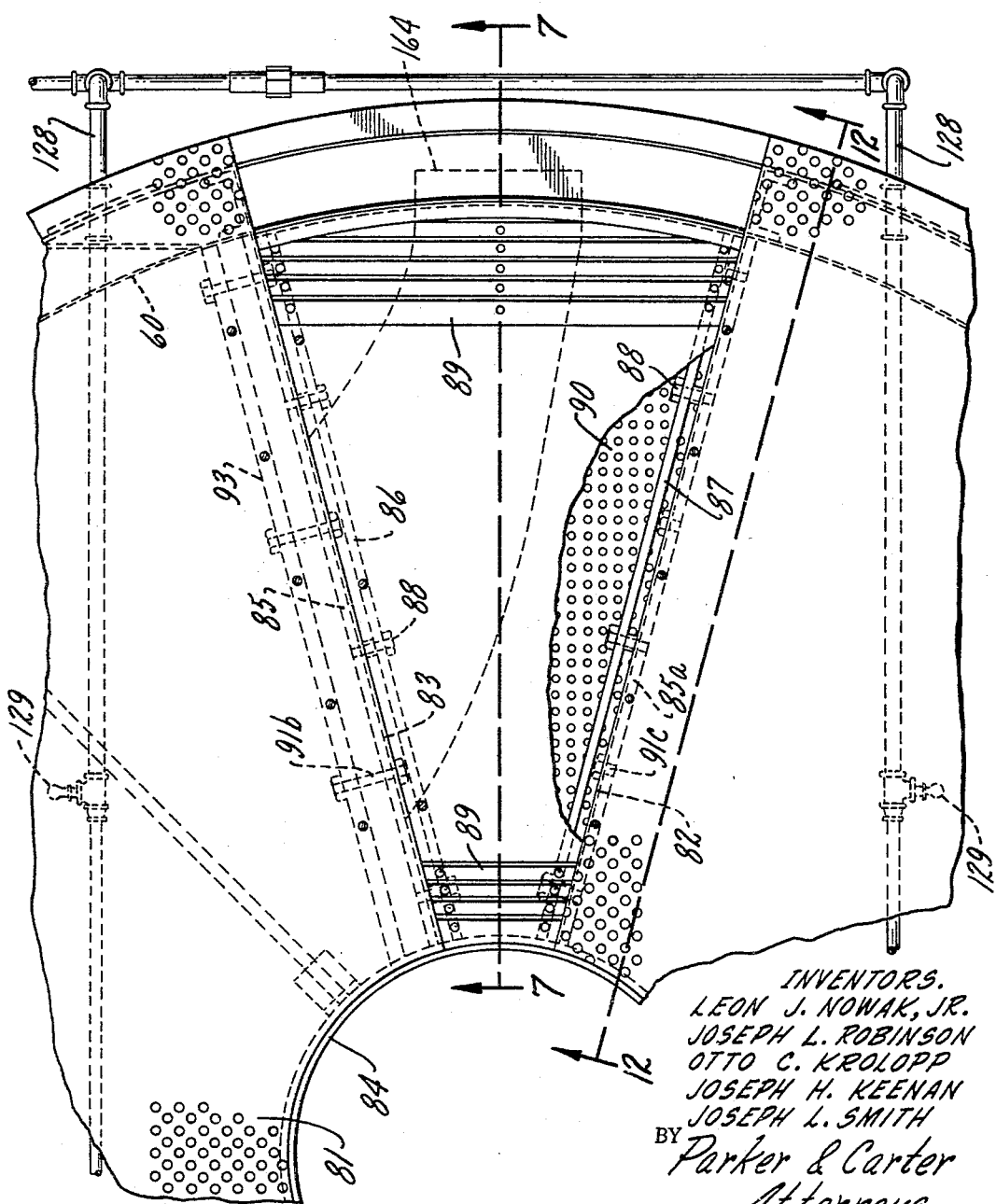

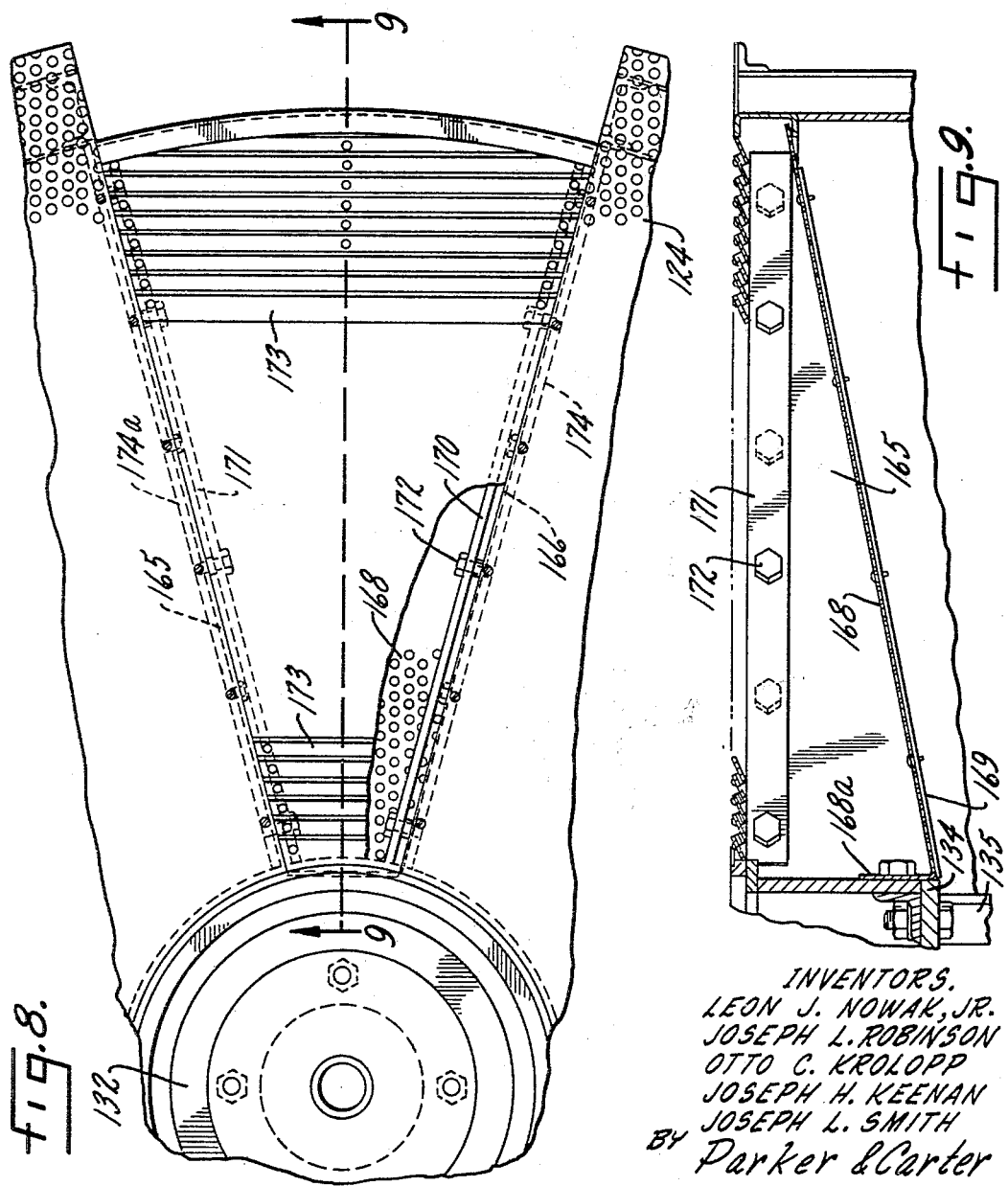

Dec. 30, 1969     L. J. NOWAK, JR., ETAL     3,486,240

ROASTING METHOD AND APPARATUS

Filed Oct. 22, 1965     9 Sheets-Sheet 8

INVENTORS.
LEON J. NOWAK, JR.
JOSEPH L. ROBINSON
OTTO C. KROLOPP
JOSEPH H. KEENAN
JOSEPH L. SMITH
BY *Parker & Carter*
       *Attorneys.*

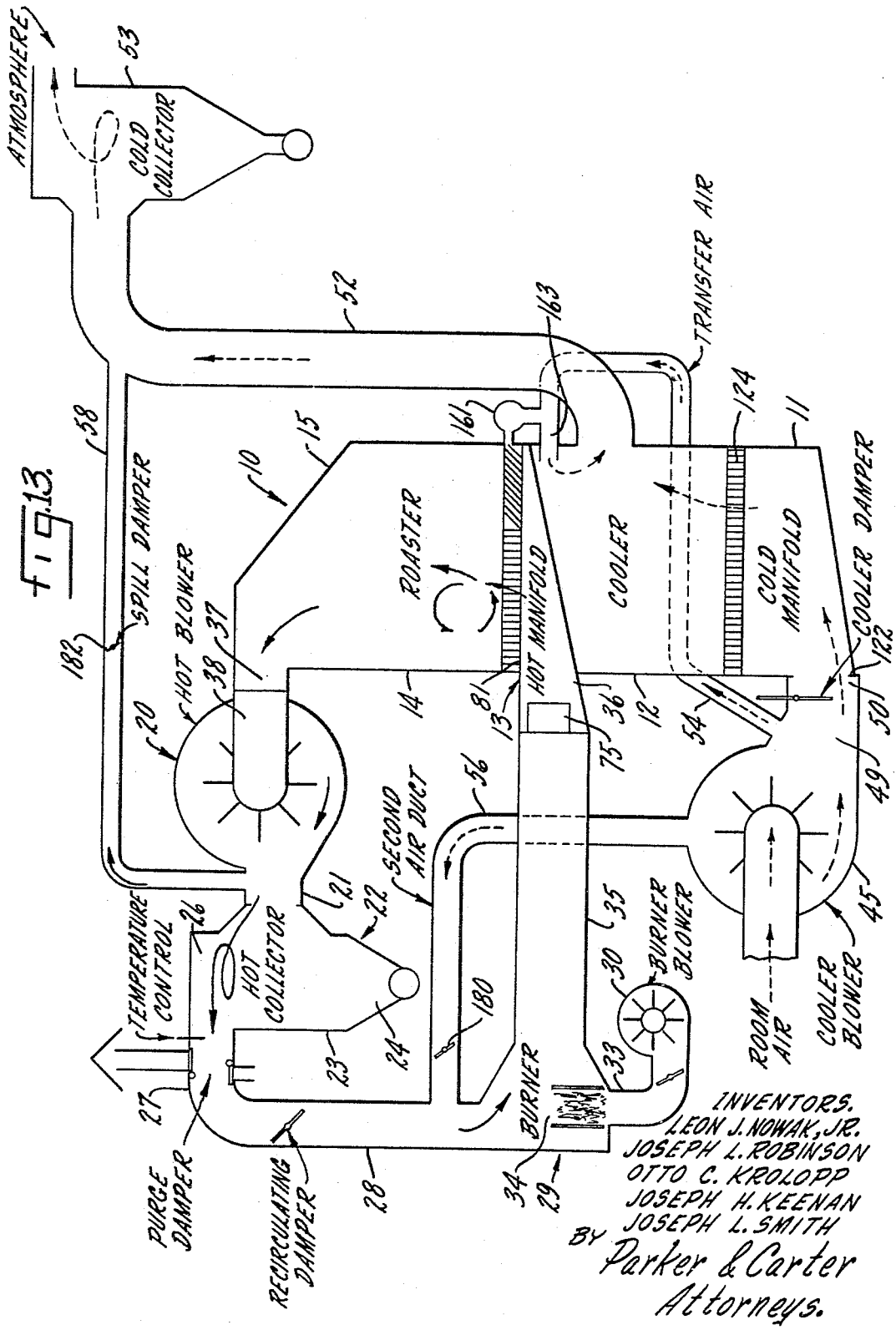

United States Patent Office 3,486,240
Patented Dec. 30, 1969

3,486,240
ROASTING METHOD AND APPARATUS
Leon J. Nowak, Jr., Liverpool, and Joseph L. Robinson, Buffalo, N.Y., Otto C. Krolopp, Villa Park, Ill., and Joseph H. Keenan, Belmont, and Joseph L. Smith, Concord, Mass., assignors to Blaw-Knox Company, Pittsburgh, Pa., a corporation of Delaware
Filed Oct. 22, 1965, Ser. No. 500,891
Int. Cl. F26b 3/10
U.S. Cl. 34—10
25 Claims

ABSTRACT OF THE DISCLOSURE

The method and apparatus for treating particulate material in which the material is moved through a roasting zone of treatment by a current of heated gas which fluidizes the material, the material is discharged into a zone for treatment with a cooling gas, and the material is then discharged for further disposal.

---

Figure 1:
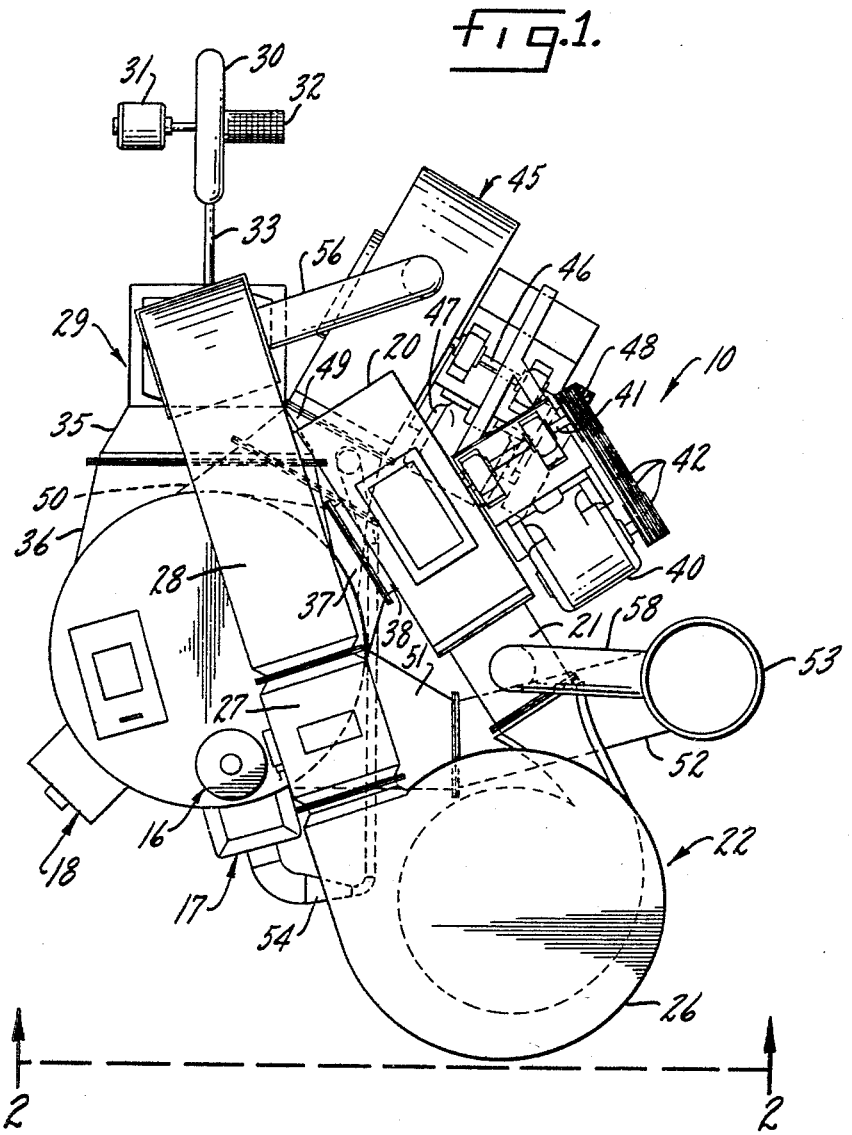

This invention relates generally to a method and apparatus for treating particulate material. More specifically the invention relates to a method and apparatus for roasting, cooling, or roasting and cooling comestibles. The method and apparatus is applicable either as herein described or with modifications within the ambit of those skilled in the art to the roasting of coffee and the treatment of nuts, cocoa, starches, leaves, seeds, milk powder agglomerates, dried vegetables and other products. The invention will be described as applied to the roasting of coffee which at present is considered to be its primary application, but it will be understood that the description is exemplary only.

Accordingly, an object of the invention is to provide a method of roasting or cooling or roasting and cooling particulate material such as coffee.

Another object is to provide a batch method of roasting coffee or other particulate material in which the batch is maintained in an agitated condition by subjection to a generally upwardly directed stream or blast of heating fluid, preferably air, as the batch is moved along a flow path.

Another object is to provide a method of roasting coffee in which a batch of coffee is moved in a closed generally circular path from a loading station to a transfer station, and thereafter moved along substantially the same path, but at a different elevation, during cooling, to a discharge station.

Yet a further object is to provide means for automatically transferring hot, roasted coffee from one elevation to another preparatory to subjection of the hot coffee to a cooling medium, the transfer being effected by the fluid medium employed to roast the coffee.

Yet another object is to provide a method of discharging cooled coffee from a roasting and cooling system by the fluid medium used to cool the coffee.

Another object is to provide a method of roasting coffee in which the rate of flow of the roasting fluid can be varied within the roasting zone so as to supply a maximum agitating force to the heaviest, densest material within the zone, the fluid flow providing, in effect, an autogenous mixing.

A further object is to provide a method of roasting coffee in which the coffee at the extremities of a batch is caused to move upwardly, and then directed inwardly and downwardly near the center of the batch treating zone, to thereby provide maximum agitation over the entire batch treating area.

Yet a further object is to provide a method of roasting coffee in which the moisture content of the coffee beans can be closely controlled by subjection of the beans to a fog treatment, the intensity of which can be varied in accordance with system demands.

Yet a further object is to provide a method of roasting coffee in which the rate of change of operating temperatures of the working fluids can be quickly controlled to provide accurate regulation of the treating cycle.

Yet a further object is to provide apparatus for performing the above-described methods.

Figure 2:
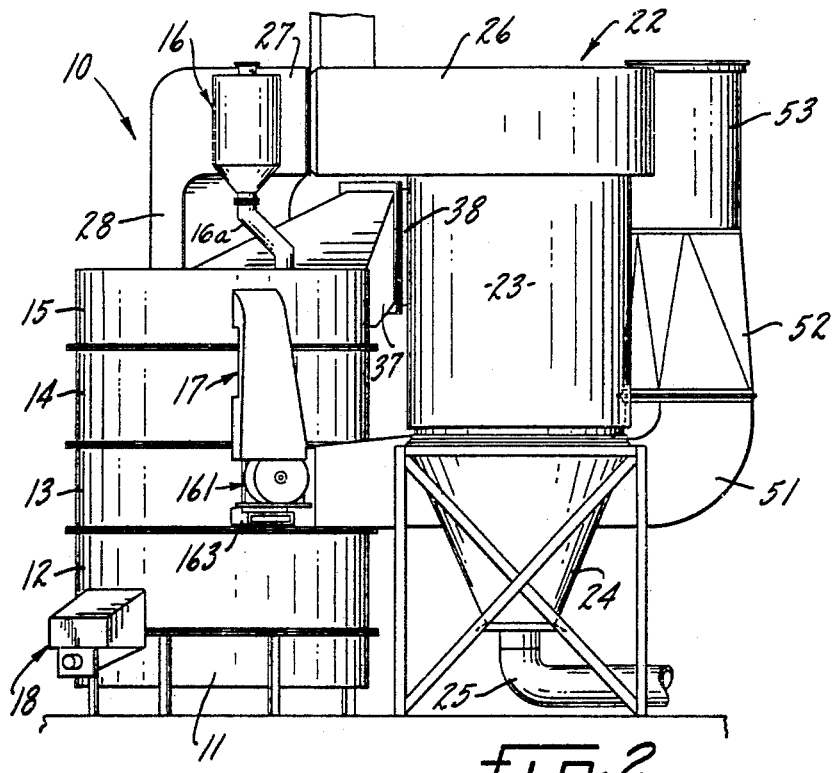
Figure 7:
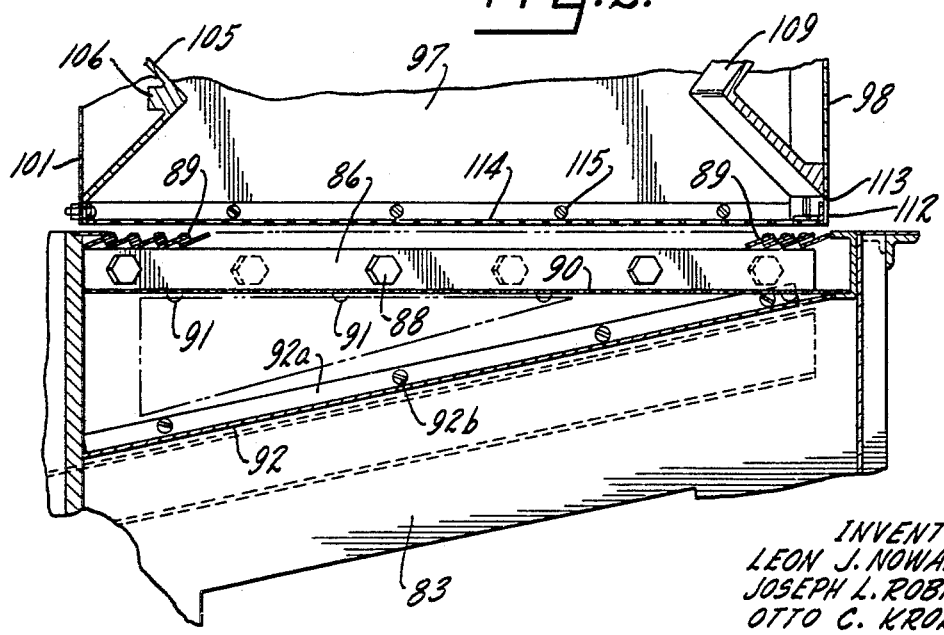
Figure 10:
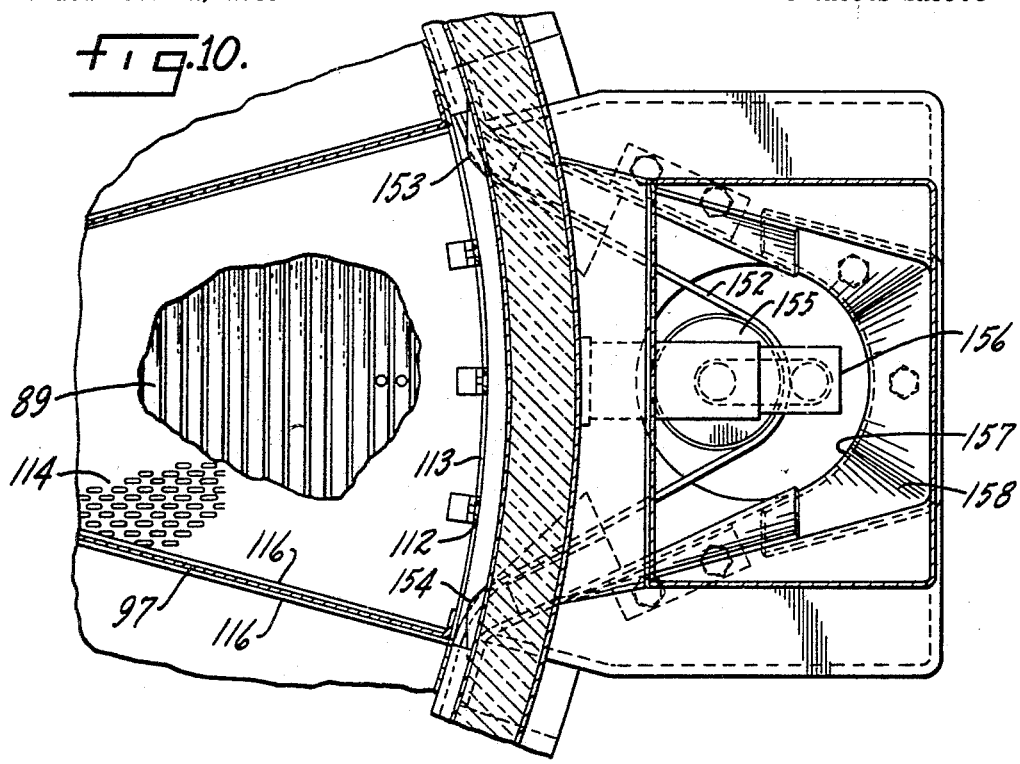
Figure 11:
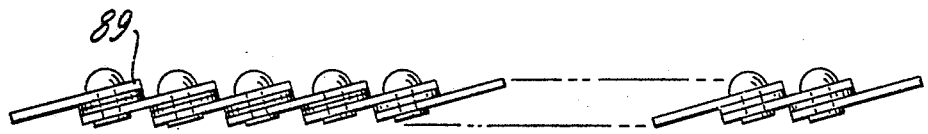
Figure 12:
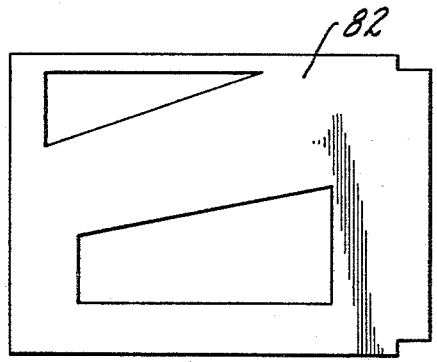

The invention is illustrated more or less diagrammatically in the accompanying drawings, wherein:

FIGURE 1 is a top plan view of the roaster;
FIGURE 2 is a side elevation of the roaster of FIGURE 1 taken substantially along the line 2—2 of FIGURE 1;
FIGURE 3a is a sectional view of the upper portion of the roaster unit showing the roaster and hot air exhaust chamber with certain parts rotated out of position for clarity;
FIGURE 3b is a sectional view of the lower portion of the roaster unit, showing the cooler, hot air manifold and material transfer devices with certain parts rotated out of position for clarity;
FIGURE 4 is a top plan view of the product divider ring assembly for both the roaster and cooler sections;
FIGURE 5 is a view, partly in plan and partly in elevation, taken substantially along the line 5—5 of FIGURE 4;
FIGURE 6 is a top detail view taken substantially along the line 6—6 of FIGURE 3b showing a portion of the hot air manifold structure at the material transfer area;
FIGURE 7 is a view taken substantially along the line 7—7 of FIGURE 6;
FIGURE 8 is a top detail view taken substantially along the line 8—8 of FIGURE 3b showing a portion of the product discharge area of the cold air manifold;
FIGURE 9 is a sectional view taken substantially along the line 9—9 of FIGURE 8;
FIGURE 10 is a top view taken substantially along the line 10—10 of FIGURE 3a with parts removed for clarity, illustrating particularly the upper material transfer mechanism;
FIGURE 11 is a detail view to an enlarged scale of the louver assembly associated with the material transfer mechanisms;
FIGURE 12 is a detail view of a dividing wall of the hot air manifold, taken substantially along the line 12—12 of FIGURE 6; and
FIGURE 13 is a schematic flow diagram of the treating fluids.

Like reference numerals will be used to refer to like parts throughout the following description of the figures.

GENERAL DESCRIPTION

The invention will first be described by only general reference to the major components as illustrated primarily in FIGURES 1, 2 and 13. Further, it will be assumed that a batch of green coffee beans are to be roasted.

The continuous roaster-cooler assembly, hereafter called roaster, is indicated generally at 10. As best seen in FIGURE 2 the chamber section consists essentially of five compartments which are, respectively, the cool air manifold 11, the cooling compartment 12, the hot air manifold and cool air flue section 13, the roasting compartment 14, and the exhaust hood assembly or exhaust flue 15. A feed hopper assembly is indicated generally at 16, a product transfer mechanism at 17, and a product discharge assembly at 18. Each of the above mentioned components will be described in further detail hereinafter.

The fluid circulatory system consists of two relatively distinct fluid flow systems, the major components of which are illustrated best in FIGURES 1 and 2. For purposes of description it will be assumed that room air is employed as the basic circulating fluid, though other fluids might be used.

The hot air system includes a hot air blower assembly 20, the output of which passes via duct 21 to the hot collector or accumulator 22. As best seen in FIGURE 2, the hot collector includes a barrel portion 23 which discharges at its lower end into a funnel 24 which in turn discharges into chaff removal apparatus 25. The aforementioned barrel portion and funnel form essentially a centrifugal separator which removes chaff which has been entrained in the roasting fluid as it passed through the beans. A hood is indicated at 26, the outlet of which opens into a purging damper assembly 27. The purging damper assembly in turn opens into a duct 28 which directs the hot air downwardly into the combustion chamber assembly 29.

Any suitable source of fuel may be used to add heat to the roasting fluid. In the present case it will be assumed that gas is employed, the heating apparatus including a gas blower 30 driven by motor 31 which draws combustion air through filter 32 and directs the gas-air mixture into the combustion chamber 34 through conduit 33.

The fuel-air mixture is burned in the combustion chamber 34 which may be of any suitable construction, including refractory walls in the fire pot area. Combustion increases the temperature of the hot air admitted to the upper end of the combustion chamber through duct 28. The heated fluid, which may be at a temperature of anywhere from 350 to 450 degrees Fahrenheit, passes through the combustion chamber assembly collar 35 and into the hot air inlet 36, shown in FIGURE 1. The hot air moves through hot air manifold and cool air flue section 13 above a manifold, shown best in FIGURES 3B and 13, passes through the roasting compartments in section 14, moves into the exhaust hood 15 and leaves the hood through the outlet duct 37, shown best in FIGURE 2. The duct opens into a short collar 38 extending toward the roaster and carried by the hot blower 20. Motor 40 drives the shaft 41 of hot blower 20 through a set of drive pulleys and drive belts indicated at 42.

The cold air circulatory system includes a cold blower 45, the drive shaft 46 of which is driven by motor 47 through a suitable set of drive pulleys and drive belts 48. Cool air moves through a cold air collar 49 which opens at its downstream end into the cold air inlet 50. The cold air inlet opens into the cool air manifold section 11, passes upwardly through the cooling compartments in section 12, and passes beneath the manifold in section 13 to the cold air outlet 51. Duct assembly 52 conveys the spent cold air upwardly to discharge or a cold collector 53.

A cold air tap is indicated at 54, the purpose of which is to assist in the deposition of the roasted beans into the cooling compartments, as will appear in detail hereinafter. The inlet of the cold air tap opens into the cold air collar 49 and its outlet is connected to the product transfer mechanism 17 as appears best in FIGURES 1 and 3B.

A second cold air tap is indicated at 56, the inlet opening into the cold blower 45 and the outlet end terminating at the duct 28. By a suitable manipulation of a damper assembly associated with the tap, the heat of the fluid leaving the combustion chamber assembly can be regulated.

A spill air duct is indicated at 58, the inlet opening into the hot blower exhaust duct 21 and the outlet opening into the cold duct 52.

The temperature of the heated fluid may lie anywhere within a wide range of temperatures. A number of factors including type of material, specific gravity of material, moisture content of the material, size of batch under treatment, and length of treatment cycle will all have a bearing on the temperature to be used in a treatment cycle. The above mentioned 350° to 450° range is set forth as illustrative of a common operating temperature range for well known types of coffee beans which are to be roasted for the American taste, and is not given as definitive of the achievable or only desirable operating temperatures.

SPECIFIC DESCRIPTION

Reference is now made to the remaining figures and primarily FIGURES 3A and 3B.

The roaster 10 is of a double wall construction, the space between the walls being filled with any suitable insulating material. An exemplary construction is indicated at the cooling compartment section 12 in FIGURE 3B, the wall being there shown as composed of an inner plate 60, an outer plate 61, and insulating material 62 disposed therebetween. The sections 11–15 are connected one to the other by pairs of channels 63, 64, a pair of L beams 65, 66, and a ring clamp 67, one channel and one ring clamp being associated with the edge of each roaster section and being disposed in vertical alignment with one another. A plate or other divider 68 is disposed between the sections, the clamp ring 67 functioning to secure the sections to one another through plate 68. Since the formation of the plate or divider 68 varies from section to section, the various plates will be described in detail as the description proceeds.

The insulated wall is, of course, discontinuous in those areas which from the inlets or outlets to the compartments. Hopper 16 feeds the green coffee beans directly into the roaster by means of conduit 16a, as illustrated in FIGURES 2 and 3A.

The hot air manifold section 13 includes inlet 36 which forms a generally rectangularly shaped inlet opening extending about 100 degrees about the chamber section periphery. A flange is indicated at 70 for connection to the combustion chamber assembly collar 35. A manifold plate is indicated at 71, the purpose of which is to prevent movement of the great bulk of the air upwardly immediately after the incoming air passes the edge 72 of the roaster wall. A damper is indicated at 75 and a control mechanism therefor at 76.

A manifold wall 77 separates the hot air chamber 78 from the cold air portion 79 of the manifold section. A circular aperture is formed in the fall to accommodate the drive mechanism 80 which will be described in detail hereinafter.

The upper end of the manifold section is formed by a perforated sheet 81 which permits upward passage of the heating air into the roasting chambers which are formed in the roaster section 14 immediately thereabove. As can be best visualized from FIGURE 6 the perforated divider plate 81 is cut away in a pie-shaped section spanning 30 degrees of its circumference. In this area is located a louver assembly, the purpose of which is to move air in a direction which will discharge the roasted material from the roasting compartment thereabove and move it into the product transfer mechanism 17 where it may be further conveyed.

A pair of generally rectangularly shaped plates 82 and 83, the outline and orientation of which may be visualized from FIGURES 3B, 6, 7 and 12, are located on either side of the louver assembly. The plates are connected at their radially inner ends as by welding to the collar 84 which is concentric with the center of the section. The exterior outline of plates 82 and 83 are identical, but plate 82 has two cut-away areas, whereas plate 83 has only one.

A pair of elongated, generally rectangular support brackets are indicated at 85 and 85a, the brackets being secured, as by welds, to the collar 84 at their inner ends and wall 60 at their outer ends. A pair of similarly shaped louver support brackets are indicated at 86, 87, these brackets being secured to and spaced from the brackets 85 and 85a, respectively, by connector assemblies 88, each of which includes a spacer. A plurality of louvers 89 are disposed upon and connected to the lower support brackets 86, 87. A 30 degree pie-shaped perforated sheet 90 is secured as by connectors 91 (see FIGURE 7) to the underside of louver brackets 86, 87. Vertical plates 82, 83 are casemented to brackets 85a and 85, respectively, by bolts 91b, 91c. By this construction it will be seen that air will pass upwardly through the apertures in the pie-shaped section sheet 90, and be directed in an upwardly and radially outwardly direction of the louvers 89.

A solid baffle plate is indicated at 92, in FIGURE 7. The upturned edges 92a thereof are connected to plates 82 and 83 by connectors 92b. A structural brace is indicated at 93, the perforated 330° divider plate 81 being secured to it as well as bracket 85a.

The roasting section 14 is illustrated best in FIGURES 4, 5 and 10.

Referring first to FIGURES 3A, 4 and 5, it will be noted that the roasting section comprises essentially a product divider ring assembly, indicated generally at 95, which forms a series of individual roasting compartments for the material to be treated. It will be noted from FIGURES 4 and 5 that the product divider ring assembly consists essentially of 12 compartments labelled respectively 96a through 96l, each compartment extending approximately 30 degrees of peripheral circumference. It will at once be apparent to those skilled in the art that a greater or lesser number of compartments may be employed depending upon the physical construction and dimensions of the roaster and the material to be roasted. Each roaster compartment consists of a generally Z-shaped upstanding wall 97 and a circular outer wall 98, the upper lip of which may be outwardly turned as at 99. The outer end of each compartment side wall 97 has an inturned portion 100 which is butted against and fastened to the outer wall 98. The inner end of each vertical side wall is in-turned and secured, as by connectors 102, to an annular ring 103 and a centrally apertured circular plate 104, both said ring and plate being associated with a drive mechanism described in detail hereinafter.

Each treatment compartment includes a pair of deflectors, the purpose of which is to cause the product under treatment to be deflected upwardly and inwardly toward the center of the compartment whence it may fall downwardly and then move outwardly along the bottom of the compartment, and be recirculated. Since the deflectors are identical from compartment to compartment a description of one will suffice for a description of all.

Referring first to FIGURE 3A, it will be noted that the inner deflector 105 consists essentially of a short V-shaped member whose vertical edges are slightly tapered, as shown best in FIGURE 4, the deflector having a boss 106 at its apex. The deflector is connected to the inturned lip portion 101 of the Z-shaped vertical wall member 97 by any suitable connector 107 which passes through the boss and a threaded anchor plate 108 located on the inner face of the inturned portion 101 of the vertical side wall member. Similarly, the outer deflector 109 consists of a triangularly shaped slightly curved member which is secured to outer wall 98 by connectors 110, 111 formed in the thickened base areas of the deflector.

Outer wall 98 terminates, at its lower end, in a series of projections 112 which extend downwardly therefrom, the projections forming transfer passages 113 therebetween. The deflectors, and primarily the outer deflector 109, is placed upwardly a distance equal to the length of the projections to avoid overlap of the transfer passage 113.

The bottom 114 of the product divider ring assembly is apertured over the entire area underlying each compartment, and the apertures are preferably elongated in a radial direction. The bottom of each compartment is secured to the adjacent vertical side members 97 by connectors 115 which pass through the edge flange 116 and lower portions of the vertical side members.

The upper ends of the individual roasting compartments in the product divider ring assembly may either be open or, preferably, closed by a perforated member, not shown, the purpose of which is to prevent inadvertent transfer of material from one compartment to another during agitation.

The top of the roasting compartment section is closed by another perforated plate 117 which concurrently forms the bottom of the hot air exhaust hood or flue section 15.

The inner side wall 118 of the exhaust hood is apertured to receive the upper discharge end of tapered chute 39, the function of which will be described hereinafter. The hood opens into a passage 119 which terminates at its discharge end in a flange 120 which is secured to the inner end of collar 38 of the hot blower.

The cooler section 12 of the roaster is illustrated best in FIGURES 3B, 8 and 9.

Referring first to FIGURES 1 and 3B, it will be noted that the cold air inlet 50 is a generally rectangularly shaped aperture which extends along approximately 90 degrees of the circumference of the roaster. The outlet includes a flange 122 which is secured to the cold air collar 49 associated with the cold blower 45.

The cold air manifold is essentially a circular chamber 123 which underlies the perforted, annularly shaped divider sheet 124. As best seen in FIGURE 8, the divider sheet is cut away along about 30 degrees of its circumference to form a discharge area which will be described hereinafter in detail.

Cold air passing into the roaster from inlet 50 and blowing upwardly through perforated divider sheet 124 cools the material which has been transferred to the compartments in cooling section 12. The cooling section includes a product divider ring assembly 125 which is identical to the product divider ring assembly in the roasting section 14, and for this reason will not be further described here. Another perforated divider plate 126 forms a top for the individual compartments which substantially eliminates overflow of the material being cooled from one compartment to another. The top 126 extends about 330° about the periphery of the roaster, the cut-away area being provided to allow material to be deposited into each compartment at the first cooling station. The wall of the cooler section is cut away as at 127 to provide an exit for cooled material from the roaster.

A plurality of water spray nozzles are indicated at 121. These nozzles supply moisture for quench of the material under treatment. The amount of moisture added and its rate of addition can be controlled in any well known manner.

The upper surface of the cooling chamber portion 79 of the manifold section is formed by manifold wall 77. A quench system, consisting in this instance of a water supply pipe 128 and a plurality of spray nozzles 129, extends into the cooling chamber section for use in the event of fire.

The drive mechanism for rotating the product divider ring assemblies in the roasting and cooling sections 12 and 14 is illustrated best in FIGURES 3A and 3B.

A drive shaft 131 is received in a base member 132 which is fast with the shaft. The base member 132 in turn is journalled in a vertical thrust bearing assembly 133 which is secured to platform 134 located at the top of framework 135. A toothed sprocket is indicated at 136, the sprocket being secured to and rotatable with the base member 132 and drive shaft 131. It will be understood that the sprocket is driven by a chain from any suitable variable speed drive source which may, for example, be a drive sprocket located close to the outside of the roaster wall. Since the particular mechanism by which power is transferred to the sprocket does not form an integral part of the invention it is not further illustrated herein.

A shield 137a is welded or otherwise suitably connected at its lower end to base member 132 and welded at its upper end to a centrally apertured circular plate 138. A plurality of tie rods are indicated at 139, four being shown in this instance, the tie rods being secured at their lower ends to the base member 132. The headed ends of the tie rods rest upon another centrally apertured circular plate 104, shown best in FIGURE 3A. An annular ring 140 is secured, as by welding, to the exterior of shield 137a. The product divided ring assembly 125 in the cooling compartment is secured to and rotatable with the drive shaft by a plurality of connectors 141, 142 which secure the inner ends 143a of the vertical wall members 143 to ring 140 and plate 138.

As best seen in FIGURE 3B, the upper surface of plate 138 terminates just below the bottom edge of stationary collar 84.

A second shield or tube 137b is shown disposed within collar 84 in the manifold section 13. Shield 137b is welded at its top to a small centrally apertured plate 144. An annular ring similar in outline to ring 144 is provided at 145 for internal reinforcement.

Upper shield section 137c (FIGURE 3A) is welded at its upper end to centrally apertured plate 104, which plate is substantially identical in configuration to plate 138. The annular ring 103 is connected to shield section 137c by welding or other suitable means. Again, the inner wall sections 101 of each compartment 96a through 96l is connected by bolts or other suitable means to the plate 104 and ring 103 so that rotation of the drive shaft will cause rotation of the product divider ring assembly 95 in the roasting section 14.

The upper end of shaft 131 is received in a suitable bearing 147 carried by a bracket assembly 148 which is secured to the roasted wall as at 149. A deflector which prevents the buildup of product is indicated at 150.

The product transfer mechanism 17 is illustrated best in FIGURES 3A, 3B, 6, 7, 10, 11 and 12.

Hot air moving upwardly through the segment shaped sheet 90 of FIGURES 3B, 6 and 7 is deflected radially outwardly and upwardly by the louvers 89. As best seen in FIGURE 11 the louvers are merely flat rectangular strips secured one to another by a rivet or other suitable means with a washer between adjacent louvers. It may be convenient, particularly near the left or radially innermost end of the louver assembly to use a double washer to provide a slightly greater air passage.

As the air moves outwardly and upwardly under the direction of the louvers which act as vanes, it will pass out the elongated apertures 113 formed in the bottom of each compartment 96a through 96l whenever a roasting compartment reaches the FIGURE 10 position. The transfer passages 113 are open to permit outward passage of the roasted beans during that portion of the travel of the product divider ring assembly when it is opposite the product transfer mechanism, shown best in FIGURE 10. At all other times the passages 113 are shut off by a belt 152 which extends about the outer surface of wall 98 at its lower edge, as best seen in FIGURE 3A. Tension on the belt is maintained by roller 155 which is mounted on adjustable bracket assembly 156 for regulation of the belt tension. Similar pulleys or belt guide weldments are indicated at 153 and 154. After the roasted beans pass radially outwardly through exposed air passages 113 they will fall downwardly through passage 157 formed in chute 158. The hot air which conveyed the beans out of the roasting compartment passes upwardly along duct section 39 whence it is returned to the hood 15, as best seen in FIGURE 3A. Since the velocity of the air decreases radically to the right or outer side of the air passages 113 the roasted beans entrained in the air as it flows through passages 113 will fall by gravity downwardly toward the cooling section.

A vaned air lock is indicated generally at 161. Any suitable power source may be connected to shaft 162 to turn the vane structure, the air lock functioning to prevent downward passage of heated air to the cooling section, upward passage of cooling air to the roasting section, and insure positive downward displacement of the roasted beans.

The roasted beans ready for cooling are deposited in the inverted T-shaped section 163 of the product transfer mechanism. Any suitable means may then be employed to move the beans radially inwardly to a compartment in the rotating cooling section. In this instance, the beans are moved radially inwardly by a blast of cold air moving in the direction of the dotted arrows of FIGURE 3B, the air being supplied from cold air tap 54 shown best in FIGURES 1, 3B and 13. As the beans move into the deflector hood 164, their velocity decreases and they drop downwardly into the open top cooling compartment passing therebeneath. The hot roasted beans are deposited into a cooling compartment located at the next station downstream from the transfer position of FIGURE 10, as best seen from FIGURES 3B and 13.

The hot beans are then subjected to the circulatory motion induced by the upward passage of air through the bottom of perforated sheet 124 as they traverse about the cooling section to the discharge station. It will be understood that by suitable control of the water spray jets 121 the moisture content of the air can be increased to the point where the beans are both quenched and cooled after traverse through the cooling section. The circulatory movement of the beans in both the roasting and cooling sections is indicated best by the arrows in FIGURE 3B.

The beans are subjected to the cooling air for 11½₂ths of the distance about the circumference of the roaster. When the beans approach the position next adjacent the loading station from the transfer mechanism, they are moved outwardly by the louver assembly illustrated best in FIGURES 3B, 8 and 9. As best seen in those figures a pair of solid surfaced triangularly shaped plates 165, 166 form the diverging, vertical sides of the louver assembly. A perforated, inclined bottom sheet 168 having an upwardly extending inner flange 168a rests upon and is secured to the inturned flanges 169 formed along the bottom edge of each of side plates 165, 166. A pair of louver support brackets are indicated at 170, 171, the louver brackets being secured to the triangularly shaped side plates 165, 166 and the bottom support brackets 174, 174a by suitable connectors 172. The individual louvers 173 which comprise the louver assembly are secured to the louver support brackets 170, 171.

When transfer passages 113a formed about the bottom periphery of product divider ring 125 are uncovered from belt 152a at the twelfth or dicharge position, the louvers 173 deflect the air in a direction to cause the cooled beans in the compartment to move generally radially outwardly into the product discharge assembly 18. A portion of the cooling fluid passes outwardly through the discharge port 175 with the cooled beans. It will be understood that any suitable receptacle such as a bag or solid container is connected to the discharge port 175 to collect the cooled beans. Thereafter, the beans may be shipped and sold in bulk or further metered and bagged into smaller batches, depending, of course, upon the product being treated.

The general operation of the roaster will be apparent from the foregoing description and accordingly a detailed description of treatment of a single ba'ch will not be set forth. There are, however, several subsidiary features which make possible accurate control of the roasting and/or cooling process over a wide range of operating parameters, and these features will next be described.

The invention includes a spill air system and a secondary air system. These air systems provide (a) fine differential pressure control at the product fluidization point and (b) optimum atmospheric conditions for complete combustion of fuel and other combustible products released during roasting. For a fuller understanding of these auxiliary systems and their functions, reference is again made to FIGURES 1, 2 and 13.

The primary flow path of the hot, recirculating air is as follows:

Hot air which has passed through the green coffee beans in the compartments of roaster section 14 are collected in hood assembly 15 and directed through duct 37 and collar 38 to the hot air blower 20. From here the spent hot fluid is passed through duct 21 to the hot collector 26. After removal of chaff and other air borne impurities in hot collector 26 the fluid is passed by duct 28 to combustion chamber assembly 29. Heat is added to the fluid and the reheated fluid is then directed by collar 35 into manifold section 13. After the heated fluid passes through the perforated divider plate 81 and the compartments in product divider ring assembly 95, it is again directed to hot blower 20, and recirculation is initiated.

It is possible that the hot circulating fluid will not agitate the products adequately at the start up and run out of a roasting cycle. This would ordinarily be due primarily to the lack of a full product bed—i.e., material disposed in the path of the fluid flow around 360° of the roasting path of movement of the material. If one or more product compartments are empty the fluid may tend to short circuit through the empty compartments.

To avoid this difficulty secondary air in cold air duct 56 is bled from the cold air blower 45 into duct 28 by regulation of damper 180. Use of this secondary air at the start or end of a roasting cycle brings the burner up to operating capacity faster. That is, by cooling the recirculating air ahead of the combustion chamber 34, the burner operation is raised to full bed operation so that the B.t.u. input per unit of time to each compartment will tend to remain constant even through a less than normal volume of heated fluid is passing into the material compartment, and the pressure beneath the roasting compartments will be increased.

In addition, secondary air may also be used to increase manifold pressure for heavy products that cannot be adequately agitated with recirculated air only.

And finally, secondary air may also be used to help burn recirculated chaff or air borne impurities, and to add fresh air to increase combustion of smoke and other combustible products released during roasting.

The primary flow path of the cooling, non-recirculating fluid is as follows:

Cooling fluid from a suitable source, usually room air, is drawn into the system by cold blower 45 and forced through cold air collar 49 and cold air inlet 50 into the cold manifold 11. After passing upwardly through perforated divider sheet 124 and the compartments in cold air product divider ring assembly 125, the fluid exits through exit duct 52. After passage through cold collector 53 the spent cooling fluid is exhausted to atmosphere.

A cold air tap 54 which exits from the cold blower 45 and opens into the product transfer chute 163 causes a small quantity of cooling fluid to by-pass the cooling compartments, but even this amount is eventually discharged through duct 52.

Spill air duct 58 has a damper 182 located therein. In order to create a negative pressure above the roasting area, and thereby increase the pressure differential across the roasting bed, hot air is spilled from the hot blower exhaust 20 into the cold collector 53 by regulation of damper 182. The hot air is mixed with cold air and passed out to atmosphere.

Because of the negative pressure above the bed there is no hot air or smoke leakage.

The spill duct 58 can also be used to control air temperature in the roasting manifold area to close tolerances, for example to within ±10° F. That is, an increase in spillage of the hot recirculating air increases the B.t.u. demand on the burner which raises the temperature in the hot manifold. However, the temperature of the recirculating fluid from just above the roasting manifold down to the entry to the combustion burner assembly will remain substantially unaffected.

The spill duct 58 is also used to discharge excessive smoke or moisture into the cold collector out of the recirculating system.

The following data is given as illustrative of the parameter control which can be accomplished with the above described invention. It will be understood that the specific values given are exemplary only, and realizable values may vary therefrom due to inherent variations in products and the application of modifications within the capabilities of those skilled in the art.

The roasting time may range from one minute to about 10 minutes, with the time variation between these limits being infinite. The speed of rotation of shaft 131 may be varied by any one of a number of well-known expedients. Individual batches of green coffee having a green weight of 40 lbs. per cubic foot may be varied from 12 to 24 pounds. Other products can be roasted or dried in batch volumes from ¼ to 1 cubic foot per compartment.

Depending on drying or roasting requirements, the temperature of the recirculating air can be maintained at any point between 150° F. to 575° F. to a tolerance of ±2° F. on most materials.

It will be understood that by suitable regulation of valves associated with the water spray nozzles 121 the rate and degree of quench of the just roasted product can be controlled to within very fine limits.

The agitation within the individual compartments in the product divider ring assemblies in both the cooling and roasting zones is dependent upon three variable parameters. These parameters are (a) the radial length of each compartment from its radially innermost wall 101 or 143 to its radially outermost wall such as 98, (b) the pressure across the product bed, and (c) the angle of inclination of the deflectors 105, 109. Solely for purposes of example, and not by way of limitation, the following data is given for a machine of known construction.

If the radial length of a compartment is about 22 inches, it has been found that the acute angle made by the lower inclined surface wall of the deflector with the vertical should be from about 40° to about 45°. The apex of the deflector would be about four inches from the top of the perforated bottom sheet, the base line of the louver inclined deflector surface being about one inch above the deflector sheet.

In such a construction, adequate agitation of coffee beans weighing about 40 pounds per cubic foot may be obtained if the pressure beneath the perforated bottom sheet 124 in the cooler manifold varies from about 1 to about 8 inches of water, gauge, and the pressure above the agitated beans varies from about 0 to about 3 inches of water, gauge. The pressure drop across the bed will therefore vary from about 0 to 8 inches of water. Similarly, satisfactory agitation is obtained if the pressure beneath the perforated divider plate 81 varies from about 0 to about 5 inches of water, gauge, and the pressure above the agitated beans varies from about minus two inches to about plus ½ inch of water. The pressure drop across the roasting bed will therefore vary from about 0 to about 7 inches of water.

The circulatory tumbling action of the beans resulting from the flow of either the roasting or cooling fluid passing through the treatment compartments may be visualized from FIGURE 3B. As the fluid adjacent the radially inner and outer walls passes through the divider sheet, its velocity is increased, as contrasted to the velocity of the fluid passing upwardly through the center of the compartment, because of the deflection imparted to it by the lower wall of the deflector. As a result the fluid pressure in the areas adjacent the apex of each deflector will be sufficiently great to overcome the counteracting effect of gravity and beans in the path of this increased air velocity will be entrained in it and lifted upwardly. As the fluid velocity decreases above the deflector the pressure will decrease to a level at which the effect of gravity predominates and the bean falls to the floor of the compartment. Each bean will work toward one of the radial end walls until such time as it reaches a point at which the fluid pressure overcomes gravity. It will be understood that the fluid passing upwardly through the center floor will keep the beans in the center area in a constant state of agitation so that each bean is eventually tumbled and knocked to the ends of the compartment where it can be entrained.

Most generally no discernable pile of material will be observable. Where roasting coffee beans for example and assuming that the pressure differential across the product bed has been adjusted to an appropriate value, there will exist essentially two mixing actions.

The first mixing action is a local mixing action in which the beans immediately adjacent the bottom of each compartment are maintained in a constant state of agitation and constantly colliding with one another as described above. The beans might be considered to form a pile having an angle of repose of 0°.

The second mixing action is a global, or circulatory type, of mixing action which is superimposed on and exists concurrently with the first mixing action. The curved arrows in FIGURE 3B are representative of this second mixing action, though it will be understood that the particles will not invariably follow the indicated paths.

There is not a clear line of demarcation between the two mixing actions. In essence there is a particle density gradient across the product bed, the greatest density being near the bottom of the bed and the least density being near the top. Ideally, the pressure differential is so set, and thereafter controlled, that no particle is carried upwardly far enough to clear the upper edge of the compartment. In any event all particles are suspended in a floating or fluid like state since they are all exposed to the upward and usually inward drag of the moving air.

The above described multiple mixing action is an important feature of the invention because such an action enables a maximum quantity of material to be treated in a minimum area as contrasted to previously known systems. Thus there are no "dead" spots where material piles up and is exposed to excess heat. At the same time, substantially maximum utilization of the space within each compartment is achieved as contrasted to systems in which only columnar circulatory paths within a given treatment space are utilizable.

Although a preferred embodiment of the invention has been illustrated and described, it will at once be apparent to those skilled in the art that variations may be made within the scope of the invention. Accordingly, the above description is intended to be taken as illustrative only and not limitative, the scope of the invention being limited only by the scope of the hereinafter appended claims.

For example, the invention may be employed in a system in which the treated material is discharged onto a conveying means which moves it to further processing or storage areas.

Furthermore, although a pair of treatment chambers, each having 12 compartments, has been described, any convenient number of stations, represented generally as N stations, may be employed.

Also, the configuration of the compartment walls may vary greatly from the illustrated embodiment. One or more of the walls may be replaced by an inclined wall, the angle of inclination being such that the top area is greater than the bottom area of the compartment. This expedient ensures that the particles drop after being conveyed upwardly because the fluid velocity decreases to a point at which the particles cannot be maintained at a high elevation. It may also be possible to achieve essentially the same result by merely extending the side walls upwardly beyond the limit of vertical travel of the beans.

What we claim is:

1. In a method of exposing particulate material to a flowing fluid passing through a confined zone of treatment, the steps comprising passing a current of treatment gas into the entrance of the zone at a uniform pressure and velocity across the entrance, and then passing the gas upwardly through the treatment zone at a pressure and velocity, in one area of the zone, sufficient to move the particles upwardly against gravity, in another area of the zone, at a pressure and velocity insufficient to overcome the effect of gravity, to thereby provide a generally circulatory type of movement of the particulate material, moving the material in the confined zone away from the treatment gas to a discharge zone, and, discharging the treated material by a current of gas.

2. In a continuous batch method of treating particulate materials, the steps comprising:
    forming a confined batch of material to be treated,
    moving the confined batch of material along a predetermined path of movement in a treatment zone,
    subjecting the confined batch of material to a uniform fluid pressure and velocity across the entrance of the zone, moving the fluid at a first pressure and velocity in one part of the batch sufficient to overcome gravity and at a second pressure and velocity in another part insufficient to overcome gravity to provide a generally circulatory agitation movement of the particulate material, and
    discharging the batch from the treatment zone after exposure to the moving fluid.

3. The method of claim 2 further characterized firstly, in that the path of movement comprises N stations, and
    secondly, in that the material is subjected to confined agitation along the pre-determined path of movement in the treatment zone for a distance equal to N—1 stations.

4. The method of claim 3 further characterized in that the batch of confined material is discharged from the treatment zone at the Nth station by entrainment in a stream of fluid which moves uni-directionally through said station.

5. In a continuous batch method of treating particulate materials, the steps comprising:
    forming a confined batch of material to be treated,
    moving the confined batch of material along a predetermined path of movement comprising N stations in a treatment zone,
    subjecting the confined batch of material to a fluid pressure differential across the depth of the batch to thereby agitate the batch within a confined space by entrainment of individual particles in the moving fluid for a distance along the predetermined path of movement in the treatment zone equal to N—1 stations to separate said particles from one another and thereby expose each particle to the moving fluid, and
    discharging the batch from the treatment zone after exposure to the moving fluid at the Nth station by entrainment in a stream of fluid which moves uni-directionally through said station, the agitation air moving in the agitating stations and the discharge air passing through the discharge station emanating from a single source.

6. In a continuous batch method of treating particulate materials, the steps comprising:
    forming a confined batch of material to be treated,
    moving the confined batch of material along a predetermined path of movement comprising N stations in a treatment zone,
    subjecting the confined batch of material to a heated fluid with a pressure differential across the depth of the batch to thereby agitate the batch within a confined space by entrainment of individual particles in the moving fluid for a distance along the predetermined path of movement in the treatment zone equal to N—1 stations to separate said particles from one moving fluid, discharging the batch from the treatment zone after exposure to the moving fluid at the Nth station by entrainment in a stream of fluid which moves unidirectionally through said station, the agitation air moving in the agitating stations and the discharge air passing through the discharge station emanating from a single source, the material is discharged from the treatment zone into a cooling zone where it is exposed to a fluid which is cooler than the fluid in the treatment zone, and each batch of material traverses a patch within the cooling zone which is identical in contour, and spaced equa-distantly from, the path of travel in the treatment zone.

7. A treatment chamber for particulate materials which includes upstanding side walls, an open top, and a pervious bottom, wherein a body of particles may be positioned for treatment, means for circulating air upwardly through said bottom at velocities effective to lift and agitate the particles, and means for maintaining an accelerated current along at least one wall of the chamber whereby to mix the contents, while circulating said particles downwardly through a portion of the chamber spaced from said wall, including a false wall for maintaining such accelerated current, said false wall having a lower surface extending upwardly and inwardly, and an upper surface extending upwardly and outwardly, in relation to the upstanding wall.

8. A treatment chamber for particulate materials which includes upstanding side walls, an open top, and a pervious bottom, wherein a body of particles may be positioned for treatment, means for circulating air upwardly through said bottom at velocities effective to lift and agitate the particles, and means for maintaining an accelerated current along at least one wall of the chamber whereby to mix the contents, while circulating said particles downwardly through a portion of the chamber spaced from said wall, including false walls for maintaining such accelerated currents, each said false wall having a lower surface extending upwardly and inwardly, and an upper surface extending upwardly and outwardly, in relation to the upstanding wall.

9. The method of removing material from a train of moving conveyors which includes maintaining a shield associated with said conveyors effective normally to prevent a conveying movement of fluid therethrough and opening said protective shield at a predetermined stage in the movement of said containers, and thereby permitting a conveying flow of fluid through said containers and said opening, whereby to remove treated material from the containers.

10. The method of claim 6 further characterized in that the batch is subjected to a pressure differential across the depth of the batch sufficient to agitate the batch within a confined volume by entrainment of the individual particles in the moving cooling fluid for a distance sufficient to separate said particles from one another and thereby expose each particle to the cooling fluid.

11. The method of claim 10 further characterized in that agitation of the particles in both the treatment and cooling zones includes an upward, counter-gravity component of movement and a downward, gravital component of movement to thereby provide a circulating type of movement to the individual particles.

12. The method of claim 11 further characterized in that transfer of each batch from the Nth station in the treatment zone to the first station in the cooling zone is effected at least in part by countercurrent, non-mingling flow of the treatment fluid and the cooling fluid.

13. The method of claim 12 further characterized firstly, in that at least the bulk of the treatment fluid is recirculated through the treatment zone, and secondly, in that none of the cooling fluid is recirculated through the cooling zone.

14. The method of claim 13 further including the step of increasing the pressure differential across the batch in the treatment zone by adding a portion of the non-recirculating cooling fluid to the recirculating fluid at a point located upstream from the batch undergoing treatment.

15. The method of claim 14 further including the step of increasing the pressure differential across the batch in the treatment zone by removing a portion of the elevated temperature recirculating fluid from the system at a point downstream from the batch which has undergone treatment.

16. An apparatus for roasting and cooling coffee and the like which includes a heating housing, a cooling housing, and means for insulating them from each other, a plurality of pervious containers in each housing, and means for moving them in closed paths, means for delivering the material to be roasted to the containers in the heating housing, means for passing a heating medium through said containers and through the material to be treated, means for removing the treated material from the containers in the heating housing and for conveying them to individual containers in the cooling housing, means for passing a cooling medium through said containers, and means for removing the cooled material, at a predetermined discharge stage, for further disposal.

17. The structure of claim 16 characterized in that the heating housing is directly above the cooling housing.

18. The structure of claim 16 characterized by means for moving the containers about a predetermined center while maintaining the containers at all time equidistant from such center.

19. The structure of claim 16 characterized in that the heating housing is directly above the cooling housing, and further characterized by means for moving the containers about a predetermined common center, while maintaining the containers at all time equidistant from such center.

20. A structure for treating particulate materials which includes a sequence of treatment chambers each having at least one generally circumferential side wall, an open top, and an air pervious bottom, means for moving said chambers through a closed and generally horizontal path, means for maintaining a flow of treatment fluid upwardly through said chambers during their lateral movement, each of the treatment chambers having at least one sidewall formed and adapted to accelerate the upward flow of fluid therealong, whereby to cause a lifting of the material, means for delivering the material to be treated to said chambers, and means for removing the treated material from said chambers.

21. Structure for transferring particulate material contained in a chamber having generally vertically upwardly extending walls from an upper to a lower elevation, said structure including, in combination, means forming an exit passage from the chamber in the lower portion of a wall thereof, means for directing fluid moving generally upwardly into the chamber along a fluid flow path which passes through said exit passage at a speed sufficient to discharge particulate material in the chamber through the exit passage, means for reducing the pressure of the moving fluid beyond the exit passage to thereby enable gravital movement to be imparted to the material until it reaches the desired lower level, and fluid means for thereafter moving the material generally laterally to a new location.

22. The structure of claim 21 further including air lock means which receives the material from the discharge fluid and exposes it to the fluid means, said air lock means forming a physical separation between the discharge fluid and the fluid means.

23. Apparatus for treating particulate material, said apparatus including, in combination, structure forming a first treatment zone,
said structure including a first chamber, a plurality of fluid pervious compartments in the first chamber, and means for imparting relative movement to the first chamber and the fluid pervious compartments to thereby move said compartments sequentially along a predetermined path of travel in the first chamber from a loading station to a transfer station, structure forming a second treatment zone,
said last mentioned structure including a second chamber, a plurality of fluid pervious compartments in the second chamber, and means for imparting relative movement to the second chamber and the fluid pervious compartments therein to thereby move said compartments sequentially along a predetermined path of travel in the second chamber from a loading station to a discharge station,
a first treatment fluid system for creating fluid flow through the compartments in the first chamber,
said first treatment fluid system including a recirculating duct system having a fluid pressure generating means, a fluid heating means contained therein, and structure forming a closed, continuous fluid flow path, the compartments in the first treatment chamber lying athwart the closed fluid flow path,
a second treatment fluid system for creating fluid flow through the compartments in the second chamber,
said second treatment fluid system including a duct system having fluid pressure generating means and structure forming a directed fluid flow path, the compartments in the second treatment chamber lying athwart the duct system,
structure associated with the compartments in each chamber for accelerating fluid flow through one portion of each chamber to thereby provide a fluid pressure differential within each chamber,
means for controlling the temperature of the treatment fluid in the recirculating duct system, and the pressure differential across each product bed in each compartment,
said control means including,
firstly, a secondary fluid duct emanating from the second fluid treatment system at a point downstream from the fluid pressure generating means therein, and opening into the recirculating duct system upstream from the fluid heating means, and means for controlling the quantity of fluid flow through the secondary fluid duct, and
secondly, a fluid spill duct emanating from the first fluid treatment system at a point downstream from the fluid pressure generating means and discharging to atmosphere, and means for controlling the quantity of fluid flow through the spill duct,
means for transfering material at the transfer station in the first chamber to the loading station in the second chamber, and means for discharging material from the discharge station in the second chamber.

24. The apparatus of claim 23 further including means associated with the recirculating duct system in the first treatment fluid system for controlling the pressure and temperature distribution in the compartments in the first treatment chamber.

25. A treatment chamber for particulate materials which includes upstanding side walls, an open top, and a pervious bottom, wherein a body of particles may be positioned for treatment, means for circulating air upwardly through said bottom at velocities effective to lift and agitate the particles, and means for maintaining an accelerated current along at least one wall of the chamber whereby to mix the contents, while circulating said particles downwardly through a portion of the chamber spaced from said wall, including a plurality of upstanding walls defining a sequence of chambers, and by false walls for maintaining such accelerated currents, each said false wall having a lower surface extending upwardly and inwardly, and an upper surface extending upwardly and outwardly, in relation to one of the upstanding walls, said false walls being disposed substantially in opposition to one another.

References Cited

UNITED STATES PATENTS

| 2,105,778 | 1/1938 | Behr et al. | |
| 2,786,280 | 3/1957 | Gishler et al. | 34—10 |
| 2,904,847 | 9/1959 | Burns. | |
| 3,063,159 | 11/1962 | Falke et al. | |
| 3,196,827 | 7/1965 | Wurster et al. | 118—62 XR |
| 3,214,844 | 11/1965 | Oates et al. | 34—10 |
| 3,253,944 | 5/1966 | Wurster. | |
| 2,635,684 | 4/1953 | Joscelyne | 34—10 XR |
| 3,136,531 | 6/1964 | Wesselingh. | |
| 3,241,520 | 3/1966 | Wurster et al. | |
| 3,311,993 | 4/1967 | Bersano | 34—187 XR |

CARLTON R. CROYLE, Primary Examiner

A. D. HERRMANN, Assistant Examiner

U.S. Cl. X.R.

34—186, 187, 211; 99—236; 259—4; 302—17